Patented Sept. 19, 1950

2,522,591

UNITED STATES PATENT OFFICE 2,522,591

PROCESS FOR MAKING PASTRY

Lucius H. Wilson and Ruth W. Wilson,
Greenwich, Conn.

No Drawing. Application March 3, 1947,
Serial No. 732,126

4 Claims. (Cl. 99—92)

This invention relates to the art of pastry making and more particularly to an improved method of blending the ingredients for pastries such as pie-crust, shells, and other baked pastry liners for various purposes well known in the baking industry.

It is an established procedure, in preparing the dough commonly used for lining and covering baked pastries such as pies or containers for various foods, to blend flour, with or without such additional ingredients as salt, sugar, flavoring materials, and the like, with a shortening agent such as fat, grease, hydrogenated vegetable oils, or other edible fatty substances, prior to the addition of a moistening agent such as water. According to ordinary procedure, the fatty substance is "cut" into the flour in such a manner that the particles of fatty material are not too thoroughly dispersed throughout the final moistened dough. The product of a properly conducted blending operation, when rolled into a thin layer or sheet and baked, affords a tender, flaky, appetizing crust or other pastry product of desirable texture. However, if the fatty material has been too thoroughly dispersed in the flour, a tough, unappetizing pastry is produced. Ordinarily, those skilled in the art have been guided by the "rule of thumb" to produce a more or less satisfactory pastry on a small-batch scale. However, the reproducibility of satisfactory results is uncertain, due to the absence of conditions conducive to exact and precise control of the steps involved. Furthermore, commercial production of pastry involves relatively large batches of dough which are difficult to control so as to produce a final product of the most desirable texture.

Various investigators have attempted to explain the irregularities encountered in pastry making. Many of these investigators have recognized the fact that relatively low temperatures are conducive to satisfactory results. Others have claimed that kneading or excessive blending or compacting of the dough is harmful. It appears that while all of these previous conclusions are correct within their own limits, the underlying difficulty in the blending procedure has not heretofore been recognized. It is our belief that when undesirable results are obtained, they are primarily due to coating of the flour particles with the fatty shortening material. When, on the other hand, the shortening is maintained as discrete particles which become coated with flour and the other dry ingredients involved, a pastry of entirely satisfactory quality is obtained. Obviously, it is difficult to obtain satisfactory blending of the ingredients by the ordinary methods employed in batch blending without causing an inversion of the dispersion of the shortening in the flour.

The present invention provides a means for preparing, by a continuous process or any desired capacity and with a remarkable degree of reproducibility, a pastry product possessing extremely desirable qualities. Moreover, the contributing causes associated with the relatively poor results ordinarily encountered in commercial pastry-making operations have been eliminated, while at the same time the nature of the final blend has been controlled within wide limits by varying, as desired, one or more of the steps involved in the process.

The present invention is based on a concept that pastry products having improved characteristics may be produced by first grinding to discrete, dry, non-sticky, non-agglomerating particles of any desired size, any of the commonly employed shortening materials which have been converted from their normally plastic state to a solidified form. In the present application, the term "solidified" is to be construed to mean that the shortening material has been chilled to such extent as to render it hard and friable and thus capable of being ground to individual, dry, free-flowing particles. Such dry and free-flowing particles of shortening may be blended with other dried ingredients of pastry doughs such as flour, salt, etc., to form a mixture comprising individual particles of shortening material coated with particles of flour, salt, etc. As hereinbefore stated, such a mixture of flour-coated shortening is productive of pastry having very desirable physical characteristics. The present invention insures the preparation of such a flour-coated shortening mixture by virtue of the fact that, as the individual particles of shortening material slowly revert to their original plastic state, they become flour-coated before there is opportunity for the undesirable reverse phase shortening-coating of the flour particles to take place. In some instances it may be desirable, because of the length of time involved in this flour-shortening mixing operation, that the blending operation be carried out at relatively low temperatures as by cooling the equipment to be used, but under ordinary circumstances the reversion of the solidified shortening particles to their original plastic state will be slow enough so that no additional cooling is necessary.

The subsequent moistening operation may be accomplished by any of the commonly employed methods, but it is preferred that the moistening be carried out by subjecting the flour-shortening blend to a fine spray or mist of water or other moistening agent to be employed for this purpose. It will be apparent that the degree of moistening may be varied within wide limits. When the moisture content of the mix has reached a desired point, the material is ready for rolling into sheets of the desired thickness and shaped according to the needs of the pastry product to be produced.

One advantage afforded by the present invention is that the dry mixture so produced may be stored for reasonable lengths of time prior to further processing thereof without adversely affecting the desirable qualities of the final pastry product. A further important feature of the invention resides in the fact that the blending operation is performed with no appreciable compacting of the materials inasmuch as the mixing of the dry ingredients is carried out by a tumbling procedure.

In carrying out the method of our invention the dry ingredients, consisting of flour, salt, etc., may be stored in any suitable container equipped with any of the well known conveying and proportioning systems of appropriate capacity. The shortening material may be stored in any suitable refrigerated container although it is preferable to employ a refrigerated hopper device equipped with suitable grinding and proportioning equipment capable of reducing the solidified, friable shortening to particles of predetermined size and delivering these particles at a controlled constant rate. It has been found that, while the particles of shortening may be relatively large, as for example they may range up to about one-half inch in diameter, best results are obtained when the particles are within the range of from about one-sixteenth to about one-quarter inch in diameter. The contents of both containers may be discharged at any desired rate into a mixing chamber wherein the materials are blended by a tumbling treatment. The blended materials are thereafter subjected to a moistening treatment in which the dry mix is sprayed with water or other desired compacting agent. Although any one of several types of mixing equipment may be employed, one which has given satisfactory results consists of a screw conveyor wherein the individual particles of shortening and other dry ingredients are tumbled as they travel along the screw. A liquid atomizing device is located at or near the discharge end of the screw conveyor and the blended, dry ingredients are moistened as they travel thereunder. The dough is thereafter discharged continuously to a rolling or sheeting machine ordinarily employed by the industry for shaping the pastry dough prior to baking.

We have found that the most satisfactory blending results are obtained when the shortening material is chilled to a temperature of less than 40° F. When temperatures closely approaching or exceeding 40° F. are employed, it is extremely difficult to reduce the shortening material to small particles due to the fact that the shortening has not become sufficiently solidified to permit satisfactory reduction thereof to discrete particles. Additionally, at these more elevated temperatures, considerable agglomeration of the shortening particles occurs and the grinding apparatus becomes fouled after a relatively short time.

In order that those skilled in the art may more thoroughly understand the invention, the following examples are presented. It is to be understood, however, that the examples are for the purposes of illustration only, the limits of the invention being defined by the appended claims. Unless otherwise specified, all parts are by weight.

Example 1

1 part of pure lard was chilled to 20° F., broken into pieces of about one inch in size and ground to particles ranging up to about one-quarter inch in diameter. The solid particles of shortening were discharged into a metal container to which had been charged 1½ parts of a commercial all-purpose flour. A small amount of salt was added to the charge. The materials were thoroughly mixed by tumbling and thereafter about 1 part of water was added as a spray while the tumbling treatment was continued.

The moistened mix was removed from the container, rolled into a thin sheet and baked for about 10 minutes at 350° F. The product was a pastry liner of excellent, flaky quality.

Example 2

The method described in Example 1 was repeated except that the shortening was chilled to −10° F. The product was very satisfactory as to texture and other desirable characteristics.

Example 3

The method of Example 1 was repeated except that the shortening was chilled to 40° F. The shortening was very difficult to grind and considerable agglomeration of the particles and fouling of the grinder occurred. The shortening material was not capable of being adequately mixed with the dry ingredients by a tumbling treatment.

Example 4

A very desirable pastry product was obtained by chilling 1 part of a commercial shortening composed of hydrogenated vegetable oil to 30° F., reducing the solidified shortening to particles ranging up to about one-quarter inch in diameter, and blending this material with flour and salt as described in Example 1.

Example 5

1 part of pure lard was chilled to 30° F. and ground to particles ranging up to about one-quarter inch in diameter. These particles were fed into a screw conveyor simultaneously with a dry mixture of 1½ parts of flour and a small amount of salt. A liquid atomizer was positioned near the end of the screw conveyor and as the mixture, after having been tumbled throughout the length of the screw conveyor system, passed thereunder it was moistened by a water spray. The moistened dough was therefore rolled into a thin sheet and baked for about 8 minutes at 360° F. The pastry product so obtained was of a very satisfactory quality.

It will be readily apparent to those skilled in the art that the method of the present invention provides a particularly satisfactory means of successfully carrying out large-scale pastry dough-making operations. The novel method of blending shortening material with other pastry ingredients makes it possible to treat the components as a dry mix, thus insuring adequate mixing and coating of the shortening particles with the other dry ingredients of the mix without causing inversion of this coating. The solidification of the shortening material, as has hereinbefore been described, may be carried out over a wide range of temperatures which are readily available in the commercial production of pastry products.

What we claim is:

1. A method of preparing a pastry product which comprises freezing a normally plastic shortening material at a temperature below 40° F. and thereby transforming it into a hard friable solid, grinding the frozen shortening material to dry, free-flowing particles, dry-mixing these frozen particles with flour and thereby thawing their surfaces sufficiently to cause the flour to adhere thereto in the form of a coating, and then moistening the flour-coated particles and rolling the resulting pastry mix.

2. A method according to claim 1 in which the shortening material is lard.

3. A method of preparing a pastry product which comprises freezing a normally plastic shortening material at a temperature below 40° F., and thereby transforming it into a hard friable solid, grinding the frozen shortening material to dry, free-flowing particles, tumbling these frozen particles with flour in the absence of free moisture and thereby thawing their surfaces and causing the flour to adhere thereto in the form of a coating, and then moistening the flour-coated particles with water and rolling and baking the resulting pastry mix.

4. A method according to claim 3 in which the shortening material is lard.

LUCIUS H. WILSON.
RUTH W. WILSON.

REFERENCES CITED

The following references are of record in the file of this patent:

UNITED STATES PATENTS

| Number | Name | Date |
|---|---|---|
| 1,117,012 | Estabrook | Nov. 10, 1914 |
| 1,119,260 | Estabrook | Dec. 1, 1914 |
| 1,231,114 | Atkinson | June 26, 1917 |

OTHER REFERENCES

Newill: Good Food and How to Cook It; D. Appleton—Century Co., N. Y., 1935, pages 376, 377.

Lowe: Experimental Cookery; 2nd Ed., John Wiley & Sons, 1937, page 570.